Feb. 4, 1969  R. J. BRINKEMA  3,425,884
METHOD OF MAKING AN OPEN MESH, RIGID, GLASS FIBER
REINFORCED RESIN STRUCTURE
Filed Nov. 6, 1967  Sheet 1 of 2

INVENTOR
ROBERT J. BRINKEMA

BY Howard N. Gowan
ATTORNEY

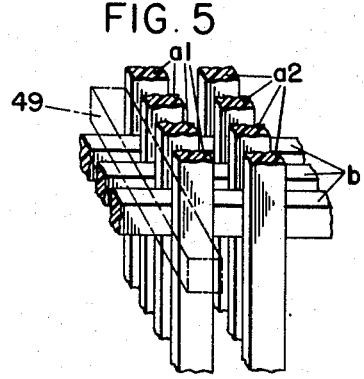
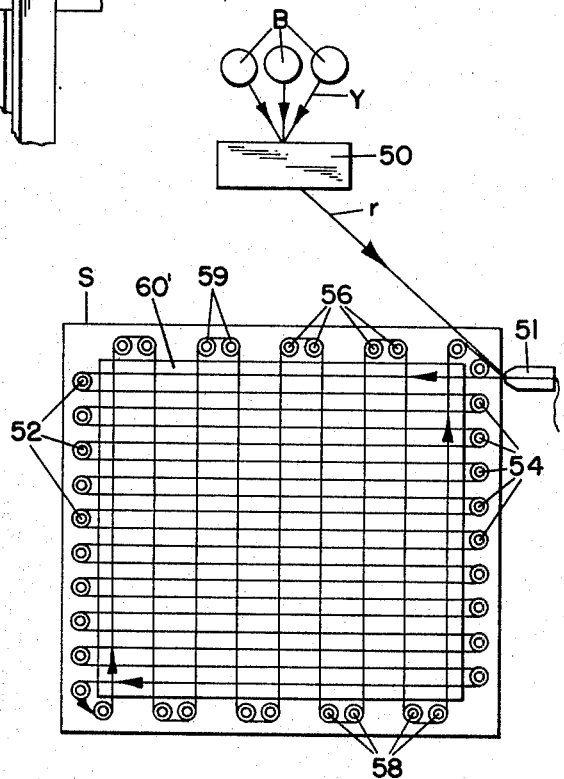
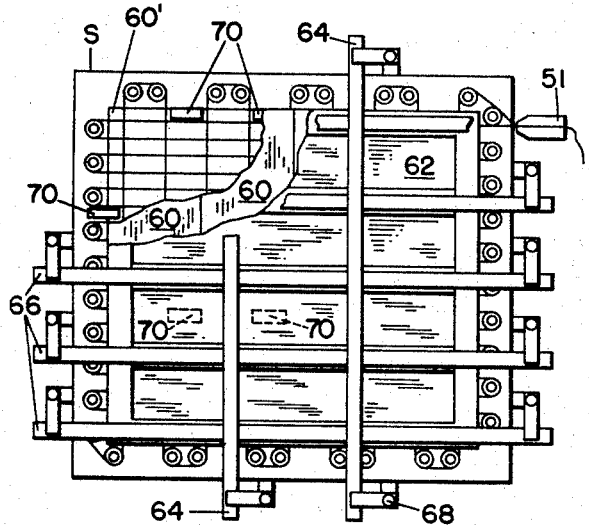

United States Patent Office
3,425,884
Patented Feb. 4, 1969

3,425,884
METHOD OF MAKING AN OPEN MESH, RIGID, GLASS FIBER REINFORCED RESIN STRUCTURE
Robert Jacob Brinkema, Rochester, Mass., assignor to Crompton & Knowles Corporation, Worcester, Mass., a corporation of Massachusetts
Continuation-in-part of applications Ser. No. 282,808, May 23, 1963, Ser. No. 552,228, May 23, 1966. This application Nov. 6, 1967, Ser. No. 680,615
U. S. Cl. 156—161                    4 Claims
Int. Cl. B32b 5/12

ABSTRACT OF THE DISCLOSURE

The method of producing multilayered glass reinforced open plastic structures comprising impregnating glass strands with resin, stringing reaches of said impregnated strand on a peg board under tension until several layers of strand are obtained, maintaining said tension while comprising said layers, and curing said resin while maintaining said tension and compression.

---

This application is a continuation-in-part of my earlier applications, Ser. No. 282,808 and Ser. No. 552,228 filed May 23, 1963 and May 23, 1966 respectively, both of which are now abandoned which were entitled "Reinforced Plastic Structure."

This invention relates to improvements in the method of producing open multilayered reinforced plastic structures, such as are found useful in gates, screens, filter leaves or plates, etc. such as disclosed in the referenced applications. It has been customary in the past to make such structures of preforated rigid sheets through which water or filtrate could pass, especially with reference to filters for such structures have been formed with a plurality of spaced pyramids or cones supporting a filter cloth to prevent it from interfering with the flow of the filtrate.

It is an important object of the invention to provide a method for the production of an open plastic structure of comparatively thin rods or elements of plastic resinous material reinforced with filaments, such as glass filaments, embedded in the plastic.

The method of the invention includes the steps of first impregnating strands or roving of glass filaments with a suitable thermosetting resin and stringing spaced reaches of the impregnated roving in a plurality of layers on a peg board under tension so that the reaches of the strand will be maintained in a straight position on the peg board. Spaced reaches of the strand is first strung in one direction across the peg board until one layer is completed. Upon reaching the end of the peg board other spaced reaches of the impregnated roving are strung at an intersecting angle with the reaches of the first layer until the second layer is completed. This procedure is continued, alternately forming layers in first one direction and then the other until the desired thickness has been accomplished, all the while maintaining the roving under a predetermined and uniform tension. When the desired thickness has been reached, then the multi-layered structure, the resin of which is still tacky, is placed under compression pressure so as to reduce its thickness and consolidate the finished layers of strand at their points of intersection while still maintaining the tension on the strand. While the strands are under such pressure and maintained under the desired tension, the resin is cured so as to form a rigid open mesh structure due to the interbonding of the various reaches of the strand with adjacent reaches at their points of intersection whereupon the pressure is removed. The structure has substantially continuous supporting columns at the points of intersection between the various reaches of the strand with the reaches of the strand going in the same direction, between points of intersection, being substantially spaced so as to permit the filtrate to flow through the structure where this is used in filtering devices. This is particularly important when the structure is to be used to support filter cloths so as to permit the filtrate to flow through the supporting structure. These and other features of the invention will appear as the description proceeds in connection with the accompanying drawing in which:

FIGURE 5 is a detailed prospective view of a portion of the open multi-layered reinforced structure illustrating the column-like support of the intersecting rovings and shows the spaced relation of the elements or rovings between such intersection points;

FIGURE 6 illustrates a method of impregnating the roving and stringing it up on the peg board to produce the open mesh structure;

FIGURE 7 illustrates the step of applying pressure to the open mesh structure preparatory to curing the resin thereof.

Figure 1:
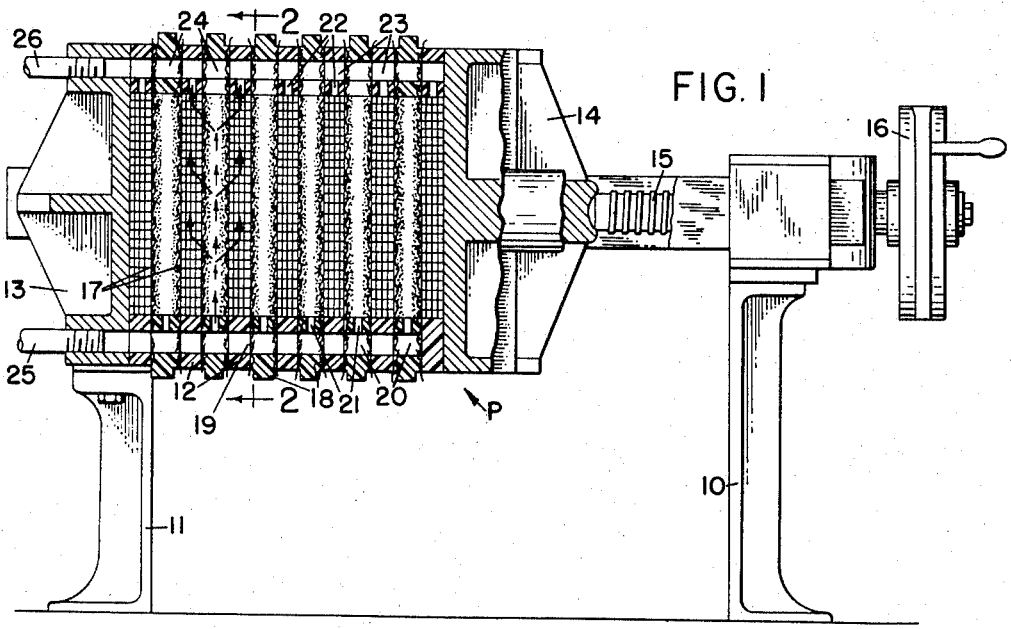
FIGURE 1 is an elevation partly in section of a filter press having several plates in place, the press features being of common form.

Referring to FIGURE 1, a filter press P having legs 10 and 11 supports a plurality of filter plates 12 between a fixed head 13 at the left and an adjustable head 14 at the right which can be moved into clamping position by means of a screw 15 and handwheel 16. FIGURE 1 shows filter cloths 17 held in place between plates 12 and frames 18 which alternate with the plates. The frames have a common inlet duct 20 which communicates with passages 21, one for each frame, through which passes the incoming slurry or material to be filtered. The filter plates are each made with a hole 19 communicating with duct 20 for passage of the slurry, and the upper ends of the plates 12 have outlet passages 22 communicating with holes 23 forming part of a common filtrate outlet duct 24 leading to a pipe 26 which delivers the filtrates to a receiver (not shown). The inlet pipe 25 is similarly understood to connect with a source (not shown) of slurry material to be filtered. It is to be understood that pipes 25 and 26 have appropriate fluid communication with passages 21 and 22 respectively. Any other desired means may be used to introduce slurry into the press and withdraw the filtrate from it.

Figure 3:
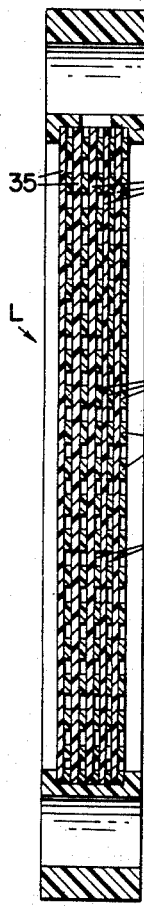
FIGURE 3 is an enlarged section taken along lines 3—3 of FIGURE 2.
Figure 2:
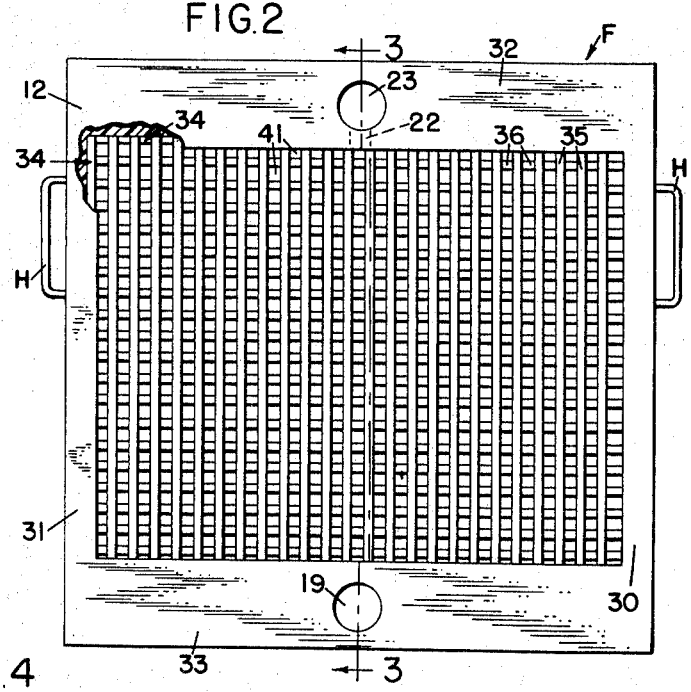
FIGURE 2 is an enlarged frontal view of a filter plate as seen looking in the direction of arrows 2—2 of FIGURE 1.

Referring more particularly to FIGURES 2 and 3 which show a filter plate 12, the latter has a frame F comprising side members 30 and 31 and top and bottom end members 32 and 33. These members are preferably made of a plastic material such as a polyester and have their ends secured to each other in any approved manner and are provided each with a lengthwise groove 34 which opens inwardly toward the center of the filter plate. The plate 12 may be considered to have opposite faces, such as right and left faces R and L, respectively, see FIGURE 3.

The side and end members have secured to them a plurality of rods or elements which are arranged in several different planes as suggested in FIGURE 3. As shown in FIGURE 2, two sets of elements are visible, the vertical primary elements 35 being parallel to the side members of the frame and the horizontal secondary elements 36 extending parallel to the end members. The elements 35 extend across the frame one end member to the other and into the slots 34 of the end members, and the elements 36 extend across the frame from one side member to the other and extend into the slots 34 of the side members. The elements 35 and 36 are arranged in planes parallel to the plane of the plate 12, elements 35 in alternate planes and elements 36 in the intermediate planes.

The elements 35 and 36 are preferably made of a resin which can be readily integrated with the side and end members, such for instance, as polyester, the rods extending into their respective slots 34 sufficiently to be integrated or cemented in any approved manner with respect to the members of the framework. The side members have handles H to facilitate their manipulation. It is to be understood that there are several layers of elements 35, adjacent elements being aligned in groups arranged at right angles to the plane of the plate. Elements 36 are similarly arranged but at right angles to elements 35. The group of elements 35 are designated at 37 and groups of elements 36 at 38. The groups 37 may be considered primary and groups 38 secondary.

Figure 4:
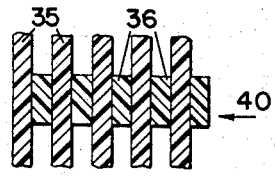
FIGURE 4 is a detailed view showing the column-like structure made by the intersection of the reaches of the rovings.

It will be understood that the groups 37 and 38 cross each other in numerous places and at each point of crossing the elements of one group, as 37, contact the elements of another group, as 38, as shown in FIGURE 4. The elements 36 alternate with the elements 35 and each crossing presents a solid plastic structure 49 extending from face to face of the plate. Each structure is very effective in resisting high compressive forces exerted against the faces of the filter plate during the filtering operation. The structure shown in FIGURE 4 is duplicated a great many times throughout the structure of the plate with the result that the plate has uniform strength throughout its area.

FIGURE 5 shows part of one of the plastic structures 49 with many parts, vertical and horizontal, removed to show the amount of free room around a structure 49 for circulation of a filtrate.

In FIGURE 5 two sets of vertical rods or bars are shown at $a^1$–$a^2$ and one set of horizontal bars $b$. The dot and dash lined enclosure may be considered to be a structure 49. From this figure, it can be seen that the filtrate can flow for the full height of bars $a^1$–$a^2$ on both the narrow sides of them, and flow similarly along the narrow tops and bottoms of bars $b$.

By referring to FIGURE 3, it will be understood that even though high pressures should deflect parts of the filter cloths into the meshes 41, the cloth cannot be deflected inwardly far enough to block off all the numerous paths for the filtrate unless the pressure is enough to perforate the cloth to the point of making it useless. There will always be some path open for outflow of the filtrate. This condition will exist even though only four layers of elements are used, two arranged at the right face R and two at the left face L. In such a case the cloths might be pressed firmly against the inner elements of the pairs of elements, as for instance elements 36 as viewed in FIGURE 2 and partway into the meshes 41 but not sufficiently to block the passages 45 which are arranged throughout the plate between said pairs of layers already mentioned. The groups are preferably spaced apart a distance equal to the width of the elements. As an example, not however to limit the scope of the invention, the elements may be ¼ inch wide and the groups, as 37, be ¼ inch apart.

Referring now to FIGURES 6 and 7 wherein the method of producing the rigid structure is shown in more detail. A plurality of glass strands Y are drawn from packages B through the impregnator 50. Any suitable impregnator can be used to impregnate strands or Y but the impregnator disclosed in U.S. application Ser. No. 673,689 for "Continuous Strand Pressure Impregnator," filed under the name of Richard B. Bryan on Oct. 9, 1967, has been found to be very well suited for impregnating the strands used in this invention.

After strands Y have been suitably impregnated, they are combined to form a roving $r$ which is then strung up on the peg board to form the rigid open mesh structure of the invention. The end of roving $r$ is held in a clamp 51 at the beginning of the string-up operation, roving $r$ then is drawn under tension across the upper surface of a support member S and found in a pin or peg 52 where it changes its direction and goes back to the opposite side of support S and around peg 54 and so on until it reaches the last peg 52 on the left hand side of FIGURE 6. The next layer of roving is laid at right angles to the initial layer with the roving $r$ being entrained, under tension, about pegs 56 and 58 as shown in FIGURE 6 until the second layer is completed. This process continues until the desired member of layers has been accumulated. Then the end roving $r$ is fixed in clamp 51 and then cut.

It is to be clearly understood that tension is maintained on roving $r$ during the string up procedure so that the roving will be certain to lie straight. It should also be noted that pegs 52, 54, 56 and 58 are provided with tubular sleeves of pasteboard 59 to prevent the impregnated strands from sticking to the pegs and to permit the easy removal of the cured multi-layered reinforced structure from the peg board used to produce it.

When the desired thickness of the impregnated roving has been strung up on peg board S, sheets of specially treated paper 60 are laid on to the upper surface of the structure. It should also be noted that sheets 60' of this specially treated paper was placed on support S prior to the beginning of the string-up procedure. This paper is specially treated so as to prevent its sticking to the particular resin used to impregnate the roving. After the upper surface of the structure has been covered by the paper, a pressure plate 62 is placed on top of the paper and inside of pegs 52, 54, 56 and 58 so as to be able to compress the structure. Pressure beams 64 and 66 are then placed across pressure plate 62 and support S and pressure plate 62 are clamped together by means of vise-like clamps 68 that may be screw down to apply any desired amount of pressure on the impregnated structure. In order to maintain a uniform thickness of the structure a plurality of spacer blocks 70 are placed around the edge of the impregnated structure as well as being interspersed at various locations in the interior portion of the structure. Spacer blocks 70 enable pressure plate 62 to compress the impregnated structure down to a uniform thickness throughout its length and breadth. After the pressure plate has been completely clamped to support S, the assembly is permitted to stand under this clamping pressure until the resin has been permitted to set or cure. Once the resin has cured or set the roving or elements $r$ are rigid and bonded together at their points of intersection and the structure can be removed from the pegs for finishing.

Finishing usually comprises severing the edge portions of the roving $r$ so as to produce a smooth edge rigid structure. This severing can be accomplished by any suitable severing means, though applicant has found it advantageous to use a saw with a diamond surface due to the severe abrasive characteristics of the resin impregnated glass strand.

A good corrosion resistant polyester resin generally contains a high percent of monomeric styrene. This produces a very thin liquid resin of quite low viscosity. It is necessary to increase the viscosity of the resin to control the percent of resin to roving and prevent draining. This is done with a small percent of microscopic particles of silica dioxide (Cab-O-Sil) a thixotropic agent. It is most important that the hardening of the resin in all layers takes place at the same time after pressure has been applied. If there is a pre-hardening of the first layers there will not be a good bond between the lower crossing bundles and excess openings will appear between them. At the same time the top layers will receive an excess amount of flattening, closing up desired area between the bundles.

This controlled hardening (polymerization) is done by a proper balance of accelerator and catalyst. The catalyst overcomes an inhibitor in the basic resin and starts the chain reaction of polymerization or molecular cross linkage. The accelerator reacting with the catalyst determines the speed the catalyst will react with the resin.

In formulating the resins for the grid there is used a thermosetting base resin, magnesium naphthenate as the accelerator and cumene hydroperoxide is the catalyst. With these materials, the previously mentioned hardening of the first layers is delayed.

The roving bundles are formed of 60 chemically resistant fiber glass strands. Four 60 end rovings make up the bundle cross section. If two end rovings were used, the cross sectional area would be small at the cross over points of the bundles and a small amount of pressure would make a solid structure at cross over and in between. This is the way fencing is made.

Three 60 end rovings with proper pressure will produce a structure like grating. Four 60 ends or more will make the open structure of the grid with properly controlled pressure. It is understood the fiber glass bundles must be held under continuous tension until the whole structure has hardened.

Having now particularly described and ascertained the nature of the invention and in what manner the same is to be performed, what is claimed is:

1. A method of making an open mesh, rigid, glass fiber reinforced resin structure, comprising the following steps:
    (a) impregnating a roving of glass fibers with a resin;
    (b) disposing a first layer of spaced reaches of said impregnated roving, under tension, in a first direction;
    (c) disposing a second layer of spaced reaches of said impregnated roving, under tension, in a second direction to intersect with the reaches of said first layer;
    (d) disposing a third layer of spaced reaches of said impregnated roving, under tension, in a direction to intersect with the reaches of said second layer at points which coincide with the intersections between the reaches of said first and second layers, whereby vertical columns are formed at said points of intersection by said intersecting reaches, thereby forming interstices between the spaced reaches of said layers;
    (e) compressing said layers so as to insure intimate contact between the reaches of said roving at said intersection points, while maintaining said reaches under tension; and
    (f) curing said resin while said layers are compressed and said reaches are maintained under tension, whereby an open mesh, rigid, glass fiber reinforced resin structure is obtained.

2. In a method as set forth in claim 1 wherein the resin comprises a thermosetting resin and an accelerator to accelerate its curing.

3. In a method as set forth in claim 1 wherein said resin is heat cured.

4. In a method as set forth in claim 1, wherein said reaches of said impregnated roving is maintained under tension sufficient to maintain them taut.

References Cited

UNITED STATES PATENTS

| | | | |
|---|---|---|---|
| 3,086,576 | 4/1963 | Thaden | 156—433 |
| 2,786,793 | 3/1957 | Shobert | 156—296 |
| 2,954,817 | 10/1960 | Havermann | 156—177 XR |
| 3,046,180 | 7/1962 | Diehl et al. | 156—161 XR |
| 3,300,354 | 1/1967 | Duft | 156—175 XR |

FOREIGN PATENTS 25,158 11/1914 Great Britain.

EARL M. BERGERT, *Primary Examiner.*

G. W. MOXON, JR., *Assistant Examiner.*

U.S. Cl. X.R.

156—166, 296, 433